US009692821B2

(12) United States Patent
Kuscher et al.

(10) Patent No.: US 9,692,821 B2
(45) Date of Patent: *Jun. 27, 2017

(54) TRANSFERRING A STATE OF AN APPLICATION FROM A FIRST COMPUTING DEVICE TO A SECOND COMPUTING DEVICE

(71) Applicant: Google Inc., Mountain View, CA (US)

(72) Inventors: Alexander Friedrich Kuscher, San Francisco, CA (US); Trond Thomas Wuellner, Mountain View, CA (US); Hristo Stefanov Stefanov, Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/628,161

(22) Filed: Feb. 20, 2015

(65) Prior Publication Data

US 2015/0172382 A1    Jun. 18, 2015

Related U.S. Application Data

(63) Continuation of application No. 13/562,209, filed on Jul. 30, 2012, now Pat. No. 8,990,343.

(51) Int. Cl.
*G06F 15/16* (2006.01)
*H04L 29/08* (2006.01)
*G06F 9/48* (2006.01)

(52) U.S. Cl.
CPC ........ *H04L 67/1095* (2013.01); *G06F 9/4856* (2013.01)

(58) Field of Classification Search
USPC ....................... 709/217, 223, 229, 203; 705/6
See application file for complete search history.

(56) References Cited

U.S. PATENT DOCUMENTS 6,886,169 B2 * 4/2005 Wei ...................... G06F 17/2247
707/E17.124
7,526,559 B1 * 4/2009 Phillips .................. H04L 67/14
709/203

(Continued)

FOREIGN PATENT DOCUMENTS

AU    2012100569 A4    6/2012
CN    101667912 A     3/2010

(Continued)

OTHER PUBLICATIONS

"Firefox Sync—Take your bookmarks, tabs and personal information with you," May 30, 2012, retrieved from <web.archive.org/web/20120530012221/http://supportmozilla.org/en-US/kb/firefox-sync-take-your-bookmarks-and-tabs-with-you>.

(Continued)

*Primary Examiner* — Tammy Nguyen
(74) *Attorney, Agent, or Firm* — McDermott Will & Emery LLP

(57) ABSTRACT

The disclosed subject matter relates to computer implemented methods for transferring a state of an application from a first computing device to a second computing device. In one aspect, a method includes receiving a first request from a first computing device to transfer a state of a first application from the first computing device to the second computing device. The method further includes sending to the second computing device, a second request for an approval to initiate the transfer. The method further includes receiving from the second computing device an approval to initiate the transfer. The method further includes receiving from the first computing device, based on the received approval, the state of the first application. The method further includes sending the received state of the first application to the second device.

20 Claims, 7 Drawing Sheets

(56) References Cited

U.S. PATENT DOCUMENTS

| | | | |
|---|---|---|---|
| 7,802,001 B1* | 9/2010 | Petry | G06F 15/16 709/223 |
| 8,171,137 B1* | 5/2012 | Parks | G06F 9/4856 705/6 |
| 2007/0054627 A1 | 3/2007 | Wormald | |
| 2007/0282990 A1 | 12/2007 | Kumar et al. | |
| 2008/0126511 A1 | 5/2008 | Appaji | |
| 2009/0187666 A1* | 7/2009 | Benschop | G06F 9/468 709/229 |
| 2010/0203833 A1 | 8/2010 | Dorsey | |
| 2011/0065384 A1 | 3/2011 | Cader et al. | |
| 2011/0256829 A1 | 10/2011 | Shimomura | |
| 2012/0066373 A1 | 3/2012 | Ochoa et al. | |
| 2014/0033293 A1 | 1/2014 | Kennedy | |

FOREIGN PATENT DOCUMENTS

| | | |
|---|---|---|
| EP | 1708423 A1 | 10/2006 |
| JP | 2007-249730 A | 9/2007 |
| JP | 2008-035520 A | 2/2008 |
| KR | 10-0911298 | 8/2009 |
| WO | WO-2010/055720 A1 | 5/2010 |

OTHER PUBLICATIONS

"Syncing without thinking, wirelessly," Aug. 15, 2008, retrieved from <web.archive.org/web/20080815052638/http://www.markspace.com/products/symbian/ms-proximity-sync-mac.php>.

"Proximity Sync 5.2 download software for Mac," Sep. 23, 2008, retrieved from <http://mac.lisisoft.com/app-software/225932-Proximity-Sync.html>.

Leggio, et al., "Achieving seamless mobility in IP-based radio access networks," IEEE Wireless Communications, Feb. 2005, vol. 12, No. 1, pp. 54-59.

Hayden, et al., "State transfer for clear and efficient runtime updates," IEEE 27$^{th}$ International Conference on Data Engineering Workshops (ICDEW), Apr. 2011, pp. 179-184.

Canadian Office Action dated Jan. 30, 2017, which issued in Canadian Application No. 2880500.

* cited by examiner

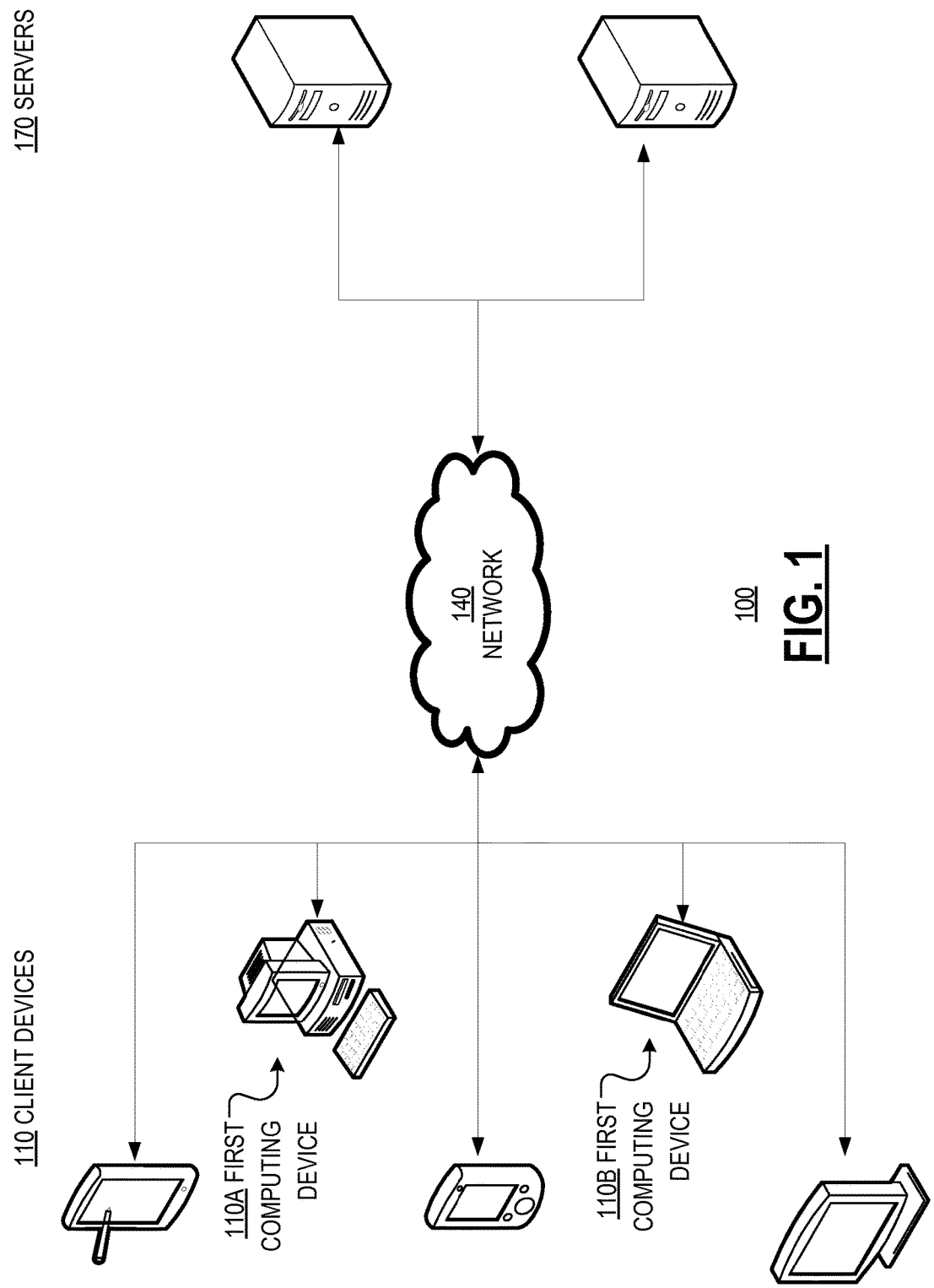

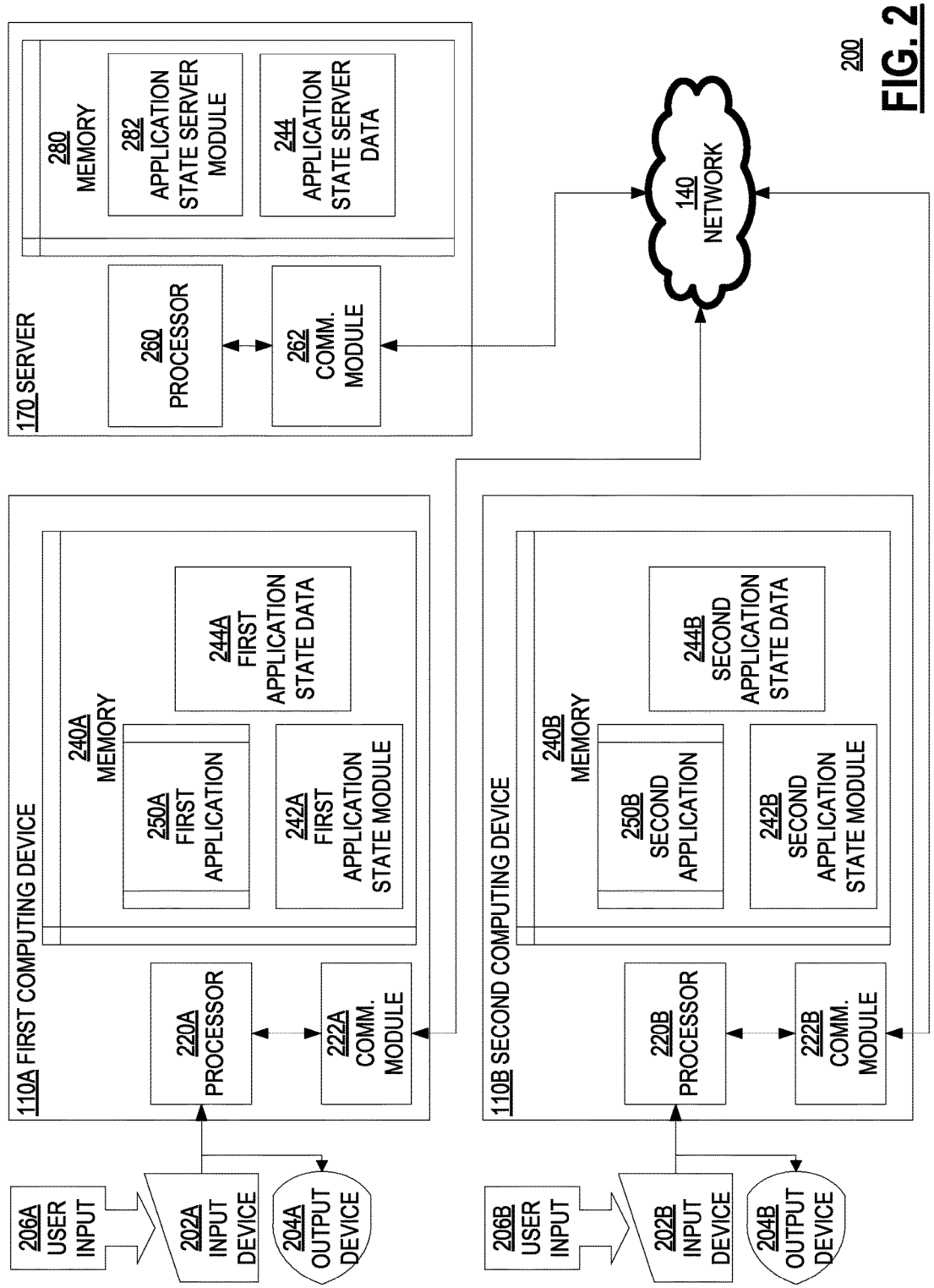

TRANSFERRING A STATE OF AN APPLICATION FROM A FIRST COMPUTING DEVICE TO A SECOND COMPUTING DEVICE

CROSS-REFERENCE TO RELATED APPLICATION

This application is a continuation of U.S. application Ser. No. 13/562,209, filed on Jul. 30, 2012, entitled "TRANSFERRING A STATE OF AN APPLICATION FROM A FIRST COMPUTING DEVICE TO A SECOND COMPUTING DEVICE," the entire contents of which are herein incorporated by reference in its entirety.

BACKGROUND

An application running on a computing device can store a variety of files in a variety of locations on the computing device. For example, an application can have data stored in the volatile memory (e.g., RAM), and in non-volatile memory (e.g., hard disk) in various locations. For example, a web browser can have data stored in, among other locations, a cookies folder, a temporary internet files folder, a favorites folder, and a history folder.

SUMMARY

The disclosed subject matter relates to a computer-implemented method transferring a state of an application from a first computing device to a second computing device. The method includes receiving from a first computing device, a first request to transfer a state of a first application on the first computing device, to a second computing device. A second application on the second computing device is configured to restore the state of the first application. The method further includes sending to the second computing device, based on the first request, a second request for an approval to initiate a transfer of the state of the first application from the first computing device to the second computing device. The method further includes receiving from the second computing device, in response to sending the second request, an approval to initiate the transfer of the state of the first application from the first computing device to the second computing device. The method further includes receiving from the first computing device, based on the received approval, the state of the first application. The method further includes sending the received state of the first application to the second device.

The disclosed subject matter further relates to a system for transferring a state of an application from a first computing device to a second computing device. The system includes a memory which includes instructions for transferring a state of an application from a first computing device to a second computing device, and a processor. The processor is configured to execute the instructions to receive from a first computing device, a first request to transfer a state of a first application on the first computing device, to a second computing device. The state of the first application corresponds to a first session of the first application on the first computing device. A second application on the second computing device is configured to restore the state of the first application to continue the first session within the second application. The processor is further configured to send to the second computing device, based on the first request, a second request for an approval to initiate a transfer of the state of the first application from the first computing device to the second computing device. The processor is further configured to receive from the second computing device, in response to sending the second request, an approval to initiate the transfer of the state of the first application from the first computing device to the second computing device. The processor is further configured to receive from the first computing device, based on the received approval, the state of the first application. The processor is further configured to send the received state of the first application to the second device. The processor is further configured to receive from the second computing device, an acknowledgement of successful receipt of the state of the first application. The processor is further configured to send, based on the received acknowledgement, to the first computing device, a notification of successful receipt by the second computing device of the state of the first application, wherein the first application is configured to remove from the first computing device, based on the notification, the state of the first application.

The disclosed subject matter further relates to a machine-readable medium including machine-readable instructions for causing a processor to execute a method for transferring a state of an application from a first computing device to a second computing device. The method includes receiving from a first computing device, a first request to transfer a state of a first application on the first computing device, to a second computing device. The second computing device is in proximity to the first computing device. A second application on the second computing device is configured to restore the state of the first application. The method further includes sending to the second computing device, based on the first request, a second request for an approval to initiate a transfer of the state from the first computing device to the second computing device. The method further includes receiving from the second computing device, in response to sending the second request, an approval to initiate the transfer of the state of the first application from the first computing device to the second computing device. The approval is based on the proximity of the second computing device to the first computing device. The method further includes receiving from the first computing device, based on the received approval, the state of the first application. The method further includes sending the received state of the first application to the second device.

The disclosed subject matter further relates to a computer-implemented method transferring a state of an application from a first computing device to a second computing device. The method includes sending to a second computing device, a request to initiate a transfer of a state of a first application on a first computing device. A second application on the second computing device is configured to restore the state of the first application. The method further includes receiving from the second computing device, in response to the sent request, an approval to initiate the transfer. The method further includes sending, based on the received approval, the state of the first application to the second computing device.

The disclosed subject matter further relates to a system for transferring a state of an application from a first computing device to a second computing device. The system includes a memory which includes instructions for transferring a state of an application from a first computing device to a second computing device, and a processor. The processor is configured to execute the instructions detect the presence of a second computing device, based on the proximity of the second computing device to the first computing device. The processor is further configured to send to the second computing device, a request to initiate a transfer of a state of a first application on a first computing device. A second application on the second computing device is configured to restore the state of the first application. The processor is further configured to receive from the second computing device, in response to the sent request, an approval to initiate the transfer. The processor is further configured to send, based on the received approval, the state of the first application to the second computing device. The processor is further configured to receive from the second computing device, an indication of a successful transfer. The processor is further configured to remove, based on the received indication, the state of the first application from the first computing device.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative, and not restrictive in nature.

DESCRIPTION OF DRAWINGS

Certain features of the subject technology are set forth in the appended claims. However, the accompanying drawings, which are included to provide further understanding, illustrate disclosed aspects and together with the description serve to explain the principles of the disclosed aspects. In the drawings:

FIG. 1 illustrates an example of an architecture for transferring a state of an application from a first computing device to a second computing device.

FIG. 2 is a block diagram illustrating an example of a first computing device, a second computing device, and a server from the architecture of FIG. 1.

DETAILED DESCRIPTION

Figure 3A:
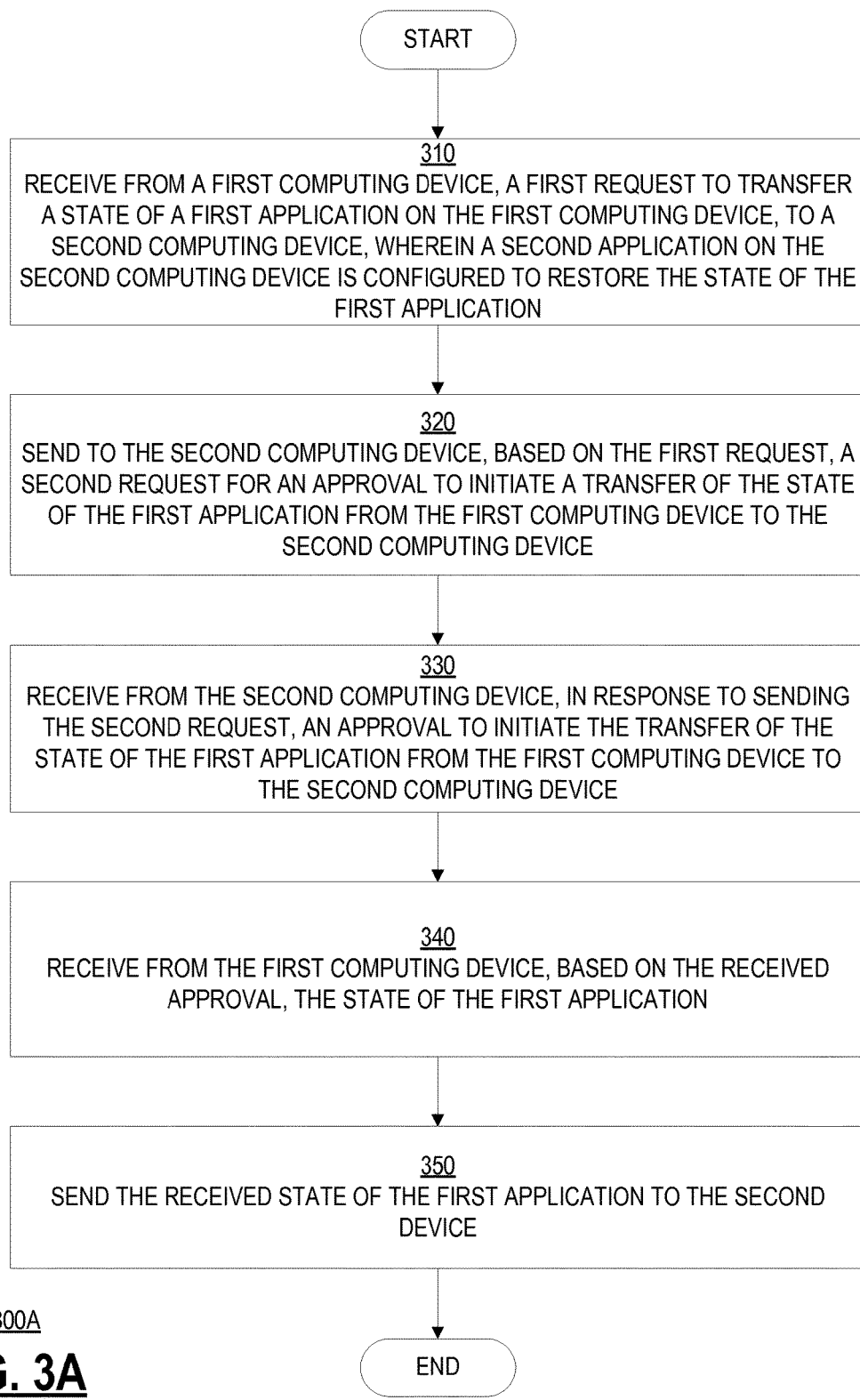
FIG. 3A illustrates a first example of a process for transferring a state of an application from a first computing device to a second computing device.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a more thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

A user, using an application on a first computing device, may wish to continue using the application on a second computing device. As an example, a user using a web-based word processing application to write a document may be considered. The user begins writing the document on a mobile touch-based tablet computer. Finding the typing on the touchscreen of the tablet computer to be less efficient than typing on a keyboard, the user decides to continue working on the document on his desktop computer.

The web-based word processing application in this example stores operation history locally on the computing device. The phrase "operation history" as used herein encompasses its plain and ordinary meaning, including, but not limited to any operations carried out by the user and/or the application. As an example, if a user types some text, the user can undo the typing, for example, by pressing CTRL-Z. The user can also redo the typing, for example, pressing CTRL-Y. Operations can be undone and/or redone based on the operation history.

In this example, because the web-based word processing application stores operation history locally on the computing device, the user can undo and/or redo operations only on that device. Thus, in this case, when the user begins using the desktop computer, the user would not be able to undo or redo any of his operations within the document.

According to certain aspects of the subject technology, systems and methods for transferring a state of an application from a first computing device (e.g., the tablet computer) to a second computing device (e.g., the desktop computer) are provided.

The terms "application state" and/or "state of an application" as used herein encompasses its plain and ordinary meaning, including, but not limited to any data generated and/or stored locally on a computing device by the application. The application state may be stored for any length of time, and in any kind of memory (e.g., volatile, non-volatile) on the computing device.

FIG. 1 illustrates an example of an architecture 100 for transferring a state of an application from a first computing device to a second computing device. The architecture 100 includes computing devices 110 and servers 170 connected over a network 140.

The computing devices 110 can be, for example, mobile computers, tablet computers, mobile devices (e.g., a smartphone or PDA), desktop computers, set top boxes (e.g., for a television), video game consoles, or any other devices having appropriate processing capabilities, communications capabilities, and memory. Each computing device 110 is configured to include an input device for accepting user input, and an output device to display information to the user.

The computing devices 110 can be connected to the network 140. The network 140 can include any one or more of a personal area network (PAN), a local area network (LAN), a campus area network (CAN), a metropolitan area network (MAN), a wide area network (WAN), a broadband network (BBN), the Internet, and the like. Further, the network 140 can include, but is not limited to, any one or more of the following network topologies, including a bus network, a star network, a ring network, a mesh network, a star-bus network, tree or hierarchical network, and the like.

Any one of the computing devices 110 can be a first computing device 110A, and another computing device 110 can be a second computing device 110B. For example, in FIG. 1, a desktop computer is illustrated as an example of a first computing device 110A, and a laptop computer is illustrated as an example of a second computing device 110B. Each computing device 110 (e.g., 110A, 110B) includes an application. For example, the first computing device 110A includes a first application, and the second computing device 110B includes a second application.

The servers 170 can be for example, stand-alone servers, shared servers, dedicated servers, cluster/grid servers (e.g., a server farm), or cloud servers. Each of the servers 170 may include one or more processors, communications modules, and memory. The servers 170 may be configured to distribute workload (e.g., for loadbalancing) across multiple servers.

FIG. 2 is a block diagram 200 illustrating an example of a first computing device 110A, a second computing device 110B and a server 170 in the architecture 100 of FIG. 1 according to certain aspects of the disclosure.

The first computing device 110A includes an input device 202A, an output device 204A, a processor 220A, a communications module 222A, and a memory 240A. The input device 202A can be a touchscreen, a mouse, a keyboard, or any other device to enable a user to supply an input 206A to the first computing device 110A. The output device 204A can be a display screen. The input 206A received via the input device 202A can be processed locally on the first computing device 110A and/or the server 170.

The first computing device 110A is connected to the network 140 via a communications module 222A. The communications module 222 is configured to interface with the network 140 to send and receive information, such as data, requests, responses, and commands to other devices on the network 140. The communications module 222A can be, for example, a modem or Ethernet card.

The memory 240A includes a first application 250A which can be used by the user to interact with the first computing device 110A and/or the server 170, and can be used to display information to the user. The first application 250A may be installed locally at the first computing device 110A and/or downloaded from the server 170.

The memory 240A further includes software instructions that can be read by the processor 220A to implement a first application state module 242A. Data generated and/or stored by the first application 250A and/or the first application state module 242A can be stored as a first application state data 244A. It should be noted that the first application state module 242A may be implemented as part of, or separate from the first application 250A.

The second computing device 110B can be similar to the first computing device 110A in many respects. For example, the second computing device 110B includes an input device 202B, an output device 204B, a processor 220B, a communications module 222B, and a memory 240B. The second input device 202B can be a touchscreen, a mouse, a keyboard, or any other device to enable a user to supply a second input 206B to the second computing device 110B. The output device 204B can be a display screen. An input 206B received via the input device 202B can be processed locally on the second computing device 110B and/or the server 170.

The second computing device 110B is connected to the network 140 via a communications module 222B. The communications module 222B is configured to interface with the network 140 to send and receive information, such as data, requests, responses, and commands to other devices on the network 140. The communications module 222B can be, for example, a modem or Ethernet card.

The memory 240B further includes software instructions that can be read by the processor 220B to implement a second application state module 242B. Data generated and/or stored by the second application 250B and/or the second application state module 242B can be stored as a second application state data 244B. It should be noted that the second application state module 242B may be implemented as part of, or separate from the second application 250B.

The processors (e.g., 220A, 220B) of the computing devices 110 (e.g., 110A, 110B) are configured to execute instructions, such as instructions physically coded into the processors (e.g., 220A, 220B), instructions read from the memory (e.g., 240A, 240B), or a combination of both. As an example, based on the instructions read from the memory 240A, the first processor can be configured to execute a method for transferring a state (e.g., 244A) of an application (e.g., 250A) from a first computing device (e.g., 110A) to a second computing device (e.g., 110B).

Considering, for example, the first computing device 110A, once the instructions from the memory 240A are loaded, the processor 220A is configured to send to a second computing device (e.g., 110B), a request to initiate a transfer of a state (e.g., 244A) of a first application (e.g., 250A) on a first computing device (e.g., 110A), wherein the second computing device (e.g., 110B) has a second application (e.g., 250B) configured to restore on the second computing device (e.g., 110B), the state (e.g., 244A) of the first application (e.g., 250A). The processor 220A is further configured to receive from the second computing device (e.g., 110B), in response to the sent request, an approval to initiate the transfer. The processor 220A is further configured to send, based on the received approval, the state (e.g., 244A) of the first application (e.g., 250A) to the second computing device (e.g., 110B).

The server 170 includes a memory 280, a processor 260, and a communications module 262. The memory 280 includes software instructions that can be read by the processor 260 to implement an application state server module 282. The application state server module 282 transfers a state of an application from a first computing device (e.g., 110A) to a second computing device (e.g., 110B). Data generated and/or stored (e.g., temporary copies) by the application state server module 282 may be stored as application state server data 284 in the memory 280 of the server 170.

The application state server module 282 receives from a first computing device (e.g., 110A), a first request to transfer a state (e.g., 244A) of a first application (e.g., 250A) on the first computing device (e.g., 110A), to a second computing device (e.g., 110B). A second application (e.g., 250B) on the second computing device (e.g., 110B) is configured to restore the state (e.g., 244A) of the first application (e.g., 250A). The application state server module 282 sends to the second computing device (e.g., 110B), based on the first request, a second request for an approval to initiate a transfer of the state (e.g., 244A) of the first application (e.g., 250A) from the first computing device (e.g., 110A) to the second computing device (e.g., 110B). The application state server module 282 receives from the second computing device (e.g., 110B), in response to sending the second request, an approval to initiate the transfer of the state (e.g., 244A) of the first application (e.g., 250A) from the first computing device (e.g., 110A) to the second computing device (e.g., 110B). The application state server module 282 receives from the first computing device (e.g., 110A), based on the received approval, the state (e.g., 244A) of the first application (e.g., 250A). The application state server module 282 sends the received state (e.g., 244A) of the first application (e.g., 250A) to the second device (e.g., 110B).

The server 170 is connected to the network 140 via a communications module 262. The communications module 262 is configured to interface with the network 140 to send and receive information, such as data, requests, responses, and commands to other devices on the network 140. The communications module 262 can be, for example, a modem or Ethernet card.

The processor 260 of the server 170 is configured to execute instructions, such as instructions physically coded into the processor 260, instructions read from the memory 280, or a combination of both. As an example, the processor 260 of the server 170 executes instructions for application state server module 282.

Once the instructions from the memory 280 are loaded, the processor 260 is configured to receive from a first computing device (e.g., 110A), a first request to transfer a state (e.g., 244A) of a first application (e.g., 250A) on the first computing device (e.g., 110A), to a second computing device (e.g., 110B). A second application (e.g., 250B) on the second computing device (e.g., 110B) is configured to restore the state (e.g., 244A) of the first application (e.g., 250A). The processor 260 is further configured to send to the second computing device (e.g., 110B), based on the first request, a second request for an approval to initiate a transfer of the state (e.g., 244A) of the first application (e.g., 250A) from the first computing device (e.g., 110A) to the second computing device (e.g., 110B). The processor 260 is further configured to receive from the second computing device (e.g., 110B), in response to sending the second request, an approval to initiate the transfer of the state (e.g., 244A) of the first application (e.g., 250A) from the first computing device (e.g., 110A) to the second computing device (e.g., 110B). The processor 260 is further configured to receive from the first computing device (e.g., 110A), based on the received approval, the state (e.g., 244A) of the first application (e.g., 250A). The processor 260 is further configured the received state (e.g., 244A) of the first application (e.g., 250A) to the second device (e.g., 110B).

Figure 3B:
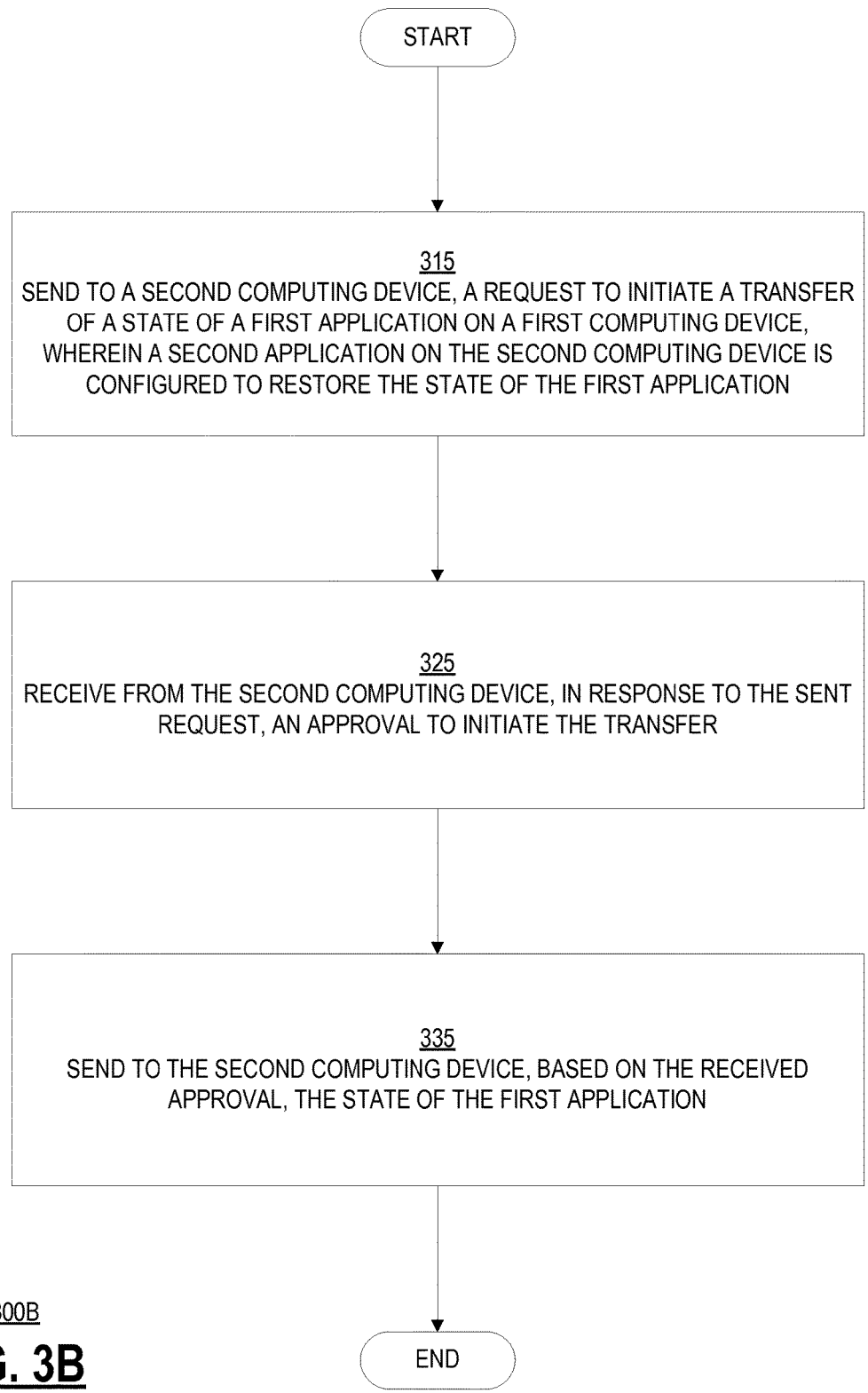
FIG. 3B illustrates a second example of a process for transferring a state of an application from a first computing device to a second computing device.

FIGS. 3A-B illustrate examples of processes 300A-B for transferring a state of an application from a first computing device to a second computing device.

FIG. 3A illustrates a first example of a process 300A for transferring a state of an application from a first computing device to a second computing device.

In step 310, the server 170 receives from a first computing device 110A, a first request to transfer a state 244A of a first application 250A on the first computing device 110A, to a second computing device 110B. A second application 250B on the second computing device 110B is configured to restore the state 244A of the first application 250A.

The state 244A of the application 250A can include any data generated and/or stored (e.g., local copies, temporary data) on the first computing device 110A. That is, any piece of information that is present on the first computing device 110A as a result of the operation of the first application 110A can be considered a part of the application state 244A. As an example, when the first application 250A is a word processing application, the application state 244A can include a document that a user is working on, operation history (e.g., undo history, redo history), user settings (e.g., file save locations), positions of the scrollbars, position of the windows of the word-processing application, temporary files (e.g., temporary files created when the document is loaded into memory for editing), and so on.

The state 244A of the first application 250A can be expressed in a variety of formats. For example, the state 244A of the first application 250A can be expressed in Document Object Model ("DOM") format. As another example, the state 244A of the first application 250A can be expressed as a single archive (e.g., a zipped file).

The first computing device 110A and the second computing device 110B can be similar or different. As an example, the first computing device 110A can be a laptop computer, and the second computing device 110B can be a tablet computer. Similarly, the first computing device 110A can be a smartphone, and the second computing device 110B can be a desktop computer.

In step 320, the server 170 sends to the second computing device 110B, based on the first request, a second request for an approval to initiate a transfer of the state 244A of the first application 250A from the first computing device 110A to the second computing device 110B. The second request can be the same as the first request. That is, the first request can be relayed, without being substantively altered, to the second computing device 110B as the second request. Alternatively, the second request can be generated by the server 170 based on the first request.

The second request for approval can be implemented in a variety of ways. For example, the server 170 can cause the second computing device 110B to display a notification on the output device 204B (e.g., a display) to a user, and prompt the user to provide input 206B (e.g., click a button) via the input device 202B (e.g., a mouse) to indicate approval. The server 170 may receive approval from the second computing device 110B without any interaction from the user. For example, the second computing device 110B can be configured in advance to provide approval in response to requests from the server 170.

In step 330, the server 170 receives from the second computing device 110B, in response to sending the second request, an approval to initiate the transfer of the state 244A of the first application 250A from the first computing device 110A to the second computing device 110B. The approval from the second computing device 110B may be received in a variety of ways. For example, a security token received from the second computing device 110B can indicate approval to initiate the transfer.

In step 340, the server 170 receives from the first computing device 110A, based on the received approval, the state 244A of the first application 250A.

In step 350, the server 170 sends the received state 244A of the first application 250A to the second device 110B. The second application 250B on the second computing device 110B can restore the state 244A of the first application 250A. That is, by using the application state 244A, the second application 250B can appear and behave as the first application 250A.

In one aspect, the server 170 can receive from the second computing device 110B, an acknowledgement of successful receipt of the state 244A of the first application 250A. The server 170 can send, based on the received acknowledgement, to the first computing device 110A, a notification of successful receipt by the second computing device 110B of the state 244A of the first application 250A. The sent notification can be the same as the received acknowledgement. That is, the received acknowledgement can be relayed, without being substantively altered, to the first computing device 110A as the sent notification. Alternatively, the sent notification can be generated by the server 170 based on the received acknowledgment.

Based on the sent notification, the first application 250A can remove the state 244A from the first computing device 110A.

FIG. 3B illustrates a second example of a process 300B for transferring a state of an application from a first computing device to a second computing device.

In step 315, the first computing device 110A sends to the second computing device 110B, a request to initiate a transfer of a state 244A of a first application 250A on the first computing device 110A. The second computing device 110B has a second application 250B configured to restore on the second computing device 110B, the state 244A of the first application 250A.

The request sent in step 315 can be triggered in a variety of ways. For example, when the first computing device 110A detects a presence of the second computing device 110B, a first notification can be provided (e.g., for display) to indicate the presence of the second computing device 110B. The first computing device 110A can detect the presence of the second computing device 110B based on the physical proximity and/or network proximity of the second computing device 110B to the first computing device 110A.

As an example of physical proximity, the first computing device 110A may detect the presence of the second computing device 110B based on Bluetooth technology. Similarly, the first computing device 110A may detect the presence of the second computing device 110B based on infrared, Wi-Fi, or any other technology that would cause the second computing device 110B to emit a discernable signal.

The first computing device 110A may detect the presence of the second computing device 110B based on the effects caused by the second computing device 110B. For example, the first computing device 110A may detect the second computing device 110B based on a specific sound pattern emitted by the second computing device 110B.

As an example of network proximity, the first computing device 110A can probe the network for the presence of other computing devices 110. For example, the first computing device 110A can scan the network for the hardware address (e.g., MAC address) of the second computing device 110B.

The first notification provided (e.g., for display) by the first computing device 110A to indicate the presence of the second computing device 110B, may be configured to accept a first command (e.g., an input). The first command can cause the first computing device 110A to send to the second computing device 110B, the request to initiate the transfer of the state 244A of the first application 250A from the first computing device 110A to the second computing device 110B.

It should be noted that the first notification may or may not require user interaction. That is, the notification, and the corresponding first command, may occur automatically based on the configuration of the first computing device.

In step 325, the first computing device 110A receives from the second computing device 110B, in response to the sent request, an approval to initiate the transfer. The approval received in step 325 can be triggered in a variety of ways. For example, when the first computing device 110A sends the request to initiate the transfer, the second computing device 110B can provide (e.g., for display) a second notification indicating the request to initiate the transfer. The second notification provided (e.g., for display) by the second computing device 110B, may be configured to accept a second command to cause the second computing device 110B to send the approval to the first computing device 110A to initiate the transfer.

In step 335, the first computing device 110A receives the approval from the second computing device 110B, and based on the received approval, sends to the second computing device 110B, the state 244A of the first application 250A.

In one aspect, the first computing device 110A may receive from the second computing device 110B, an indication of a successful transfer of the state 244A of the first application 250A. Based on the received indication, the first application 250A can remove the state 244A from the first computing device 110A.

It should be noted that although processes 300A-B are described above with reference to the systems of FIGS. 1 and 2, processes 300A-B are not limited to such, and can be performed by other systems and/or configurations. For example, the first request of step 310 and/or the approval of step 320 may be based on a detection of proximity as described in steps 315 and 325. That is, transfer of the state 244A of the first application 250A may be made contingent (e.g., for security reasons) upon the proximity of the first computing device 110A and the second computing device 110B.

Figure 4A:
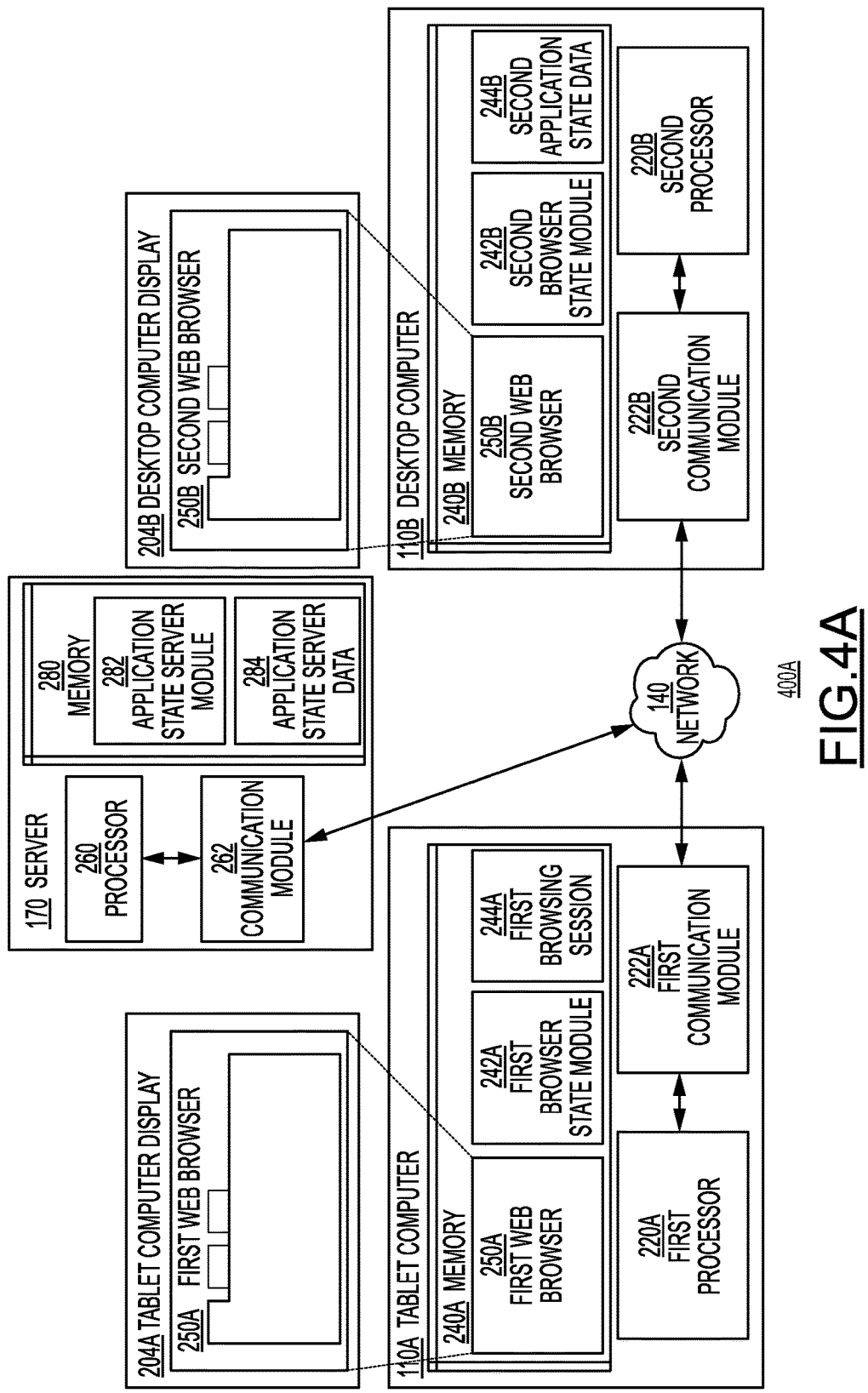
FIG. 4A is an illustration of a first example of a system associated with the example process of FIG. 3A.

An example will now be described using the examples of the processes 300A-B of FIGS. 3A-B. In the first example, illustrated in FIG. 4A, a tablet computer will be used as the first computing device 110A, a first web browser on the tablet computer will be used as a first application 250A, a browsing session of the first web browser, hereinafter referred to as the first browsing session, will be used as the state 244A of the first application 250A, a desktop computer will be used as a second computing device 110B, and a second web browser on the desktop computer will be used as the second application 250B.

In this example, a user using the tablet computer 110A decides to purchase a book from an online retailer. As the user begins the checkout process to complete the purchase, the user is asked to enter his shipping and billing information. Finding the typing on the touchscreen of the tablet computer to be frustrating, the user decides to switch to the desktop computer.

The process 300A begins when the user decides to transfer the first browsing session 244A from the tablet computer to the desktop computer 110B.

In step 310, the server 170 receives from the tablet computer 110A, a first request to transfer the first browsing session 244A of the first web browser 250A on the tablet computer 110A, to the desktop computer 110B. A second web browser 250B on the desktop computer 110B is configured to restore the browsing 244A of the first web browser 250A.

The first browsing session 244A on the tablet computer 110A includes all files pertaining to the user's web activity. For example, the first browsing session includes the particular web page being viewed by the user, the associated temporary files, cookies, URL history, window and/or tab positions, and so on. The first browsing session 244A in this example is expressed in Document Object Model ("DOM") format.

In step 320, the server 170 sends to the desktop computer 110B, based on the first request, a second request for an approval to initiate a transfer of the first browsing session 244A of the first web browser 250A from the tablet computer 110A to the desktop computer 110B. In this example, the second request sent to the desktop computer 110B is generated by the server 170 based on the first request received from the tablet computer 110A.

The desktop computer 110B is configured to automatically accept an incoming transfer from the tablet computer 110A. Thus, the desktop computer 110B automatically sends an approval to the server 170.

In step 330, the server 170 receives the approval from the desktop computer 110B, to initiate the transfer of the first browsing session 244A of the first web browser 250A from the tablet computer 110A.

In step 340, based on the received approval, the server 170 receives the first browsing session 244A from the tablet computer 110A.

In step 350, the server 170 sends the browsing session 244A to the desktop computer 110B. The first browsing session 244A, and any other data stored (e.g., as a temporary copy) or generated based on the operations of step 340 may be stored on the server 170 as application state server data 284.

The second web browser 250B on the desktop computer 110B then restores the first browsing session 244A of the first web browser 250A. The user then completes the purchase from the desktop computer 110B.

Figure 4B:
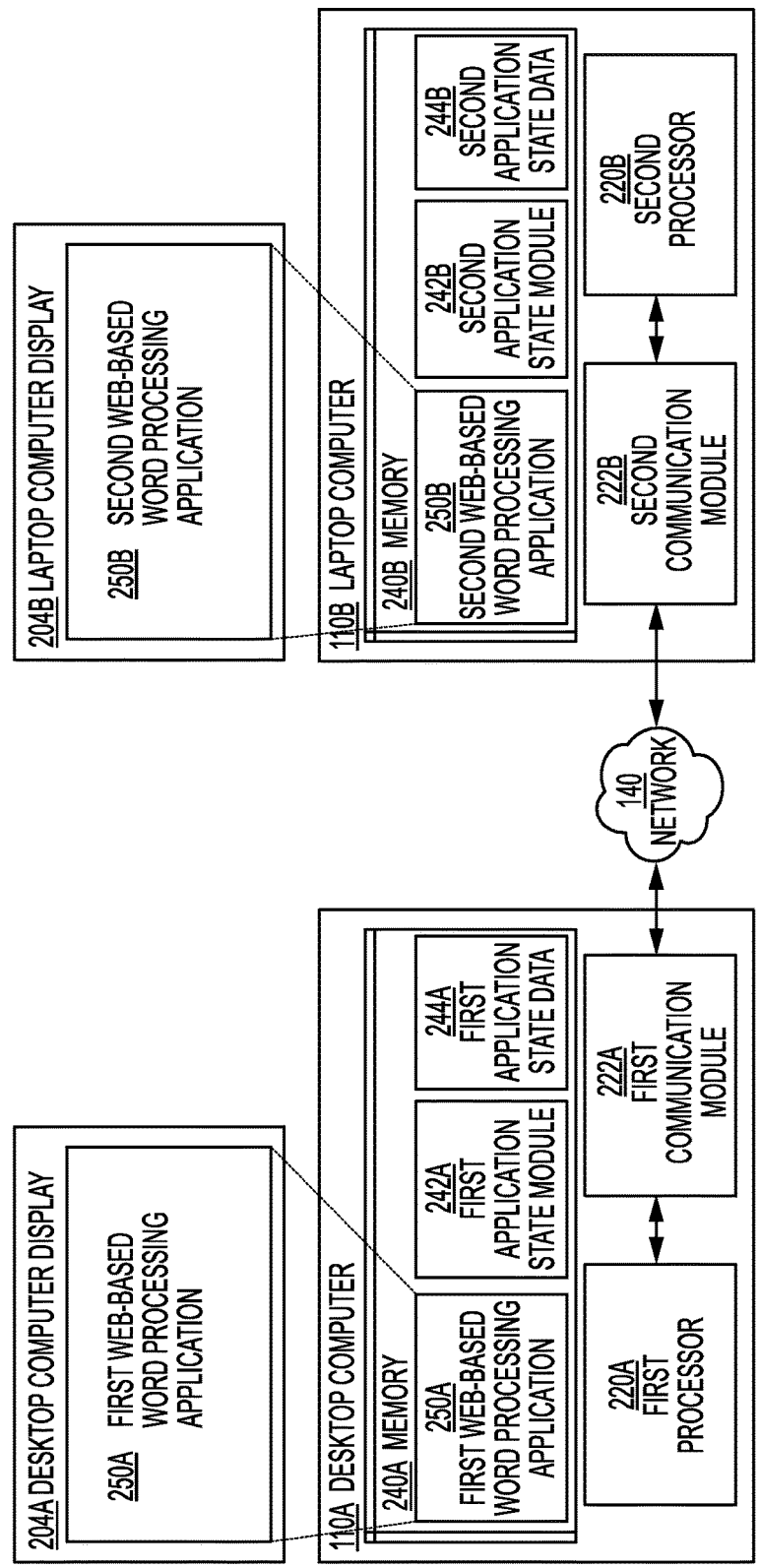
FIG. 4B is an illustration of a second example of a system associated with the example process of FIG. 3B.

In the second example, illustrated in FIG. 4B, a desktop computer will be used as the first computing device 110A, a first web-based word processing application on the desktop computer will be used as a first application 250A, files associated with the first web-based word processing application will be used as the state 244A of the first application 250A, a laptop computer will be used as a second computing device 110B, and a second web-based word processing application on the laptop computer will be used as the second application 250B.

In this example, a user is in his office, and is using a web-based word processing application to edit a document. The web-based application is capable of creating and/or editing documents offline. The user has to travel by airplane on a business trip to another location to attend a meeting.

The process 300B begins when the user decides to transfer the state 244A of the first web-based word processing application 250A to the laptop computer 110B, which the user will take with him on his business trip. The user decides to transfer the state 244A so that he can have access to the operation history (e.g., undo history) for the document he is editing.

In step 315, the desktop computer 110A sends to the laptop computer 110B, a request to initiate a transfer of the state 244A of first web-based word processing application 250A on the desktop computer 110A. The laptop computer 110B has a web browser which has stored for offline use, the web-based word processing application, hereinafter referred to as the second web-based word processing application 250B. The second web-based word processing application 250B is configured to restore the state 244A of the first web-based word processing application 250A.

The request sent in step 315 is triggered when the desktop computer 110A detects the presence of the laptop computer 110B. The desktop computer 110A detects the laptop computer 110B based on a Bluetooth signal received from the laptop computer 110B.

In step 325, the desktop computer 110A receives from the laptop computer 110B, in response to the sent request, an approval to initiate the transfer. The approval in step 325 is in the form of a security token received by the desktop computer 110A from the laptop computer 110B.

In step 335, based on the received approval, the desktop computer 110A sends the state 244A of the first web-based word processing application 250A to the laptop computer 110B. The second web-based word processing application 250B then restores the state 244A, and the user can then continue to work on the document on the laptop computer 110B.

Figure 5:
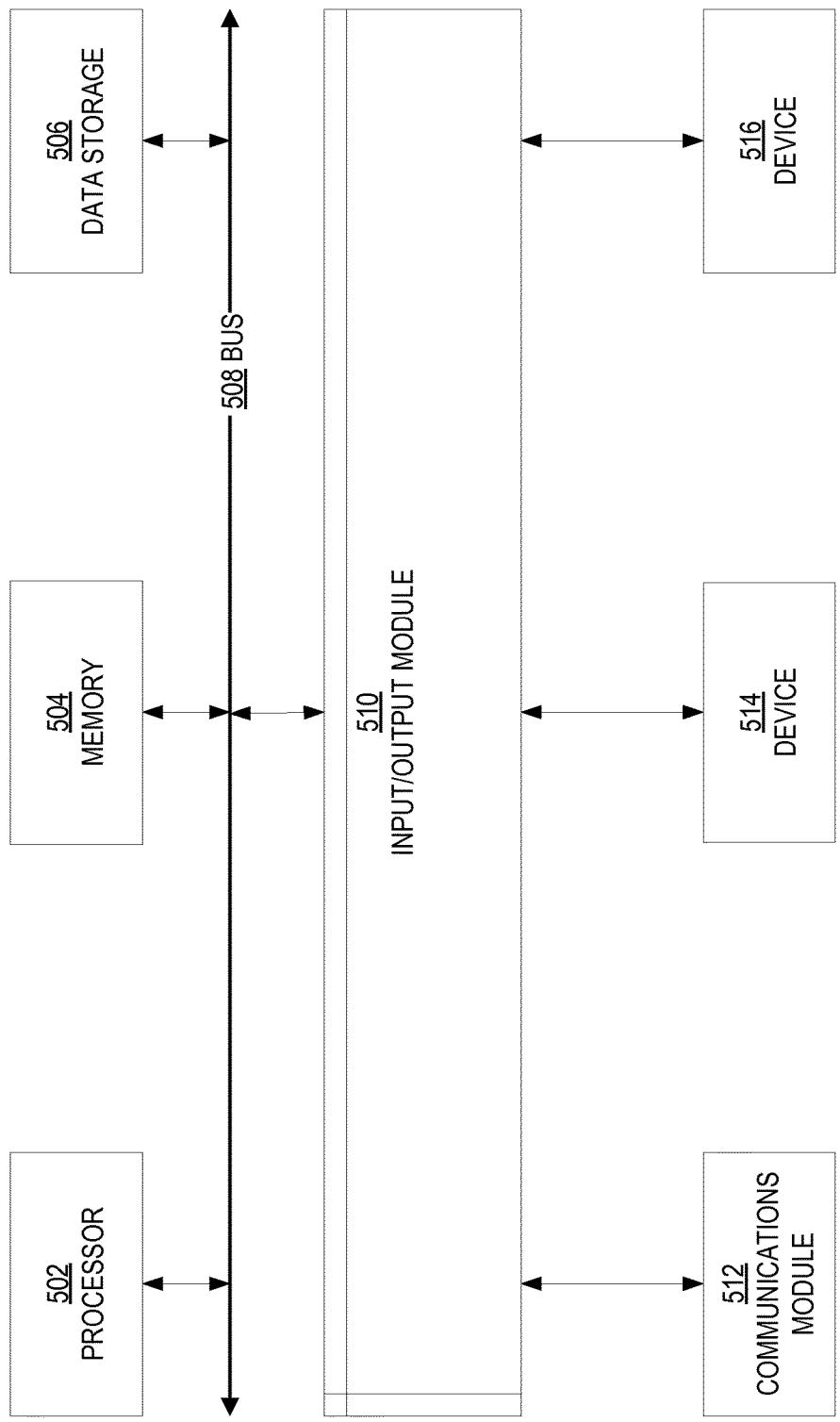
FIG. 5 conceptually illustrates an electronic system with which some aspects of the subject technology can be implemented.

FIG. 5 conceptually illustrates an electronic system with which some aspects of the subject technology can be implemented. For example, FIG. 5 illustrates an example of a computer system 500 with which the computing device 110 or the server 170 of FIG. 2 can be implemented. In certain aspects, the computer system 500 may be implemented using hardware or a combination of software and hardware, either in a dedicated server, or integrated into another entity, or distributed across multiple entities.

Computer system 500 (e.g., computing device 110, server 170) includes a bus 508 or other communication mechanism for communicating information, and a processor 502 (e.g., processor 220, processor 260) coupled with bus 508 for processing information. By way of example, the computer system 500 may be implemented with one or more processors 502. Processor 502 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 500 can include, in addition to hardware, code that creates an execution environment for the computer program in question, e.g., code that constitutes processor firmware, a protocol stack, a database management system, an operating system, or a combination of one or more of them stored in an included memory 504 (e.g., memory 240, memory 280), such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 508 for storing information and instructions to be executed by processor 502. The processor 502 and the memory 504 can be supplemented by, or incorporated in, special purpose logic circuitry.

The instructions may be stored in the memory 504 and implemented in one or more computer program products, i.e., one or more modules of computer program instructions encoded on a computer readable medium for execution by, or to control the operation of, the computer system 500, and according to any method well known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, embeddable languages, and xml-based languages. Memory 504 may also be used for storing temporary variable or other intermediate information during execution of instructions to be executed by processor 502.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 500 further includes a data storage device 506 such as a magnetic disk or optical disk, coupled to bus 508 for storing information and instructions. Computer system 500 may be coupled via input/output module 510 to various devices. The input/output module 510 can be any input/output module. Examples of input/output modules 510 include data ports such as USB ports. The input/output module 510 is configured to connect to a communications module 512. Examples of communications modules 512 (e.g., communications module 222, communications module 262) include networking interface cards, such as Ethernet cards and modems. In certain aspects, the input/output module 510 is configured to connect to a plurality of devices, such as an input device 514 (e.g., input device 202) and/or an output device 516 (e.g., output device 204). Examples of input devices 514 include a keyboard and a pointing device, e.g., a mouse or a trackball, by which a user can provide input to the computer system 500. Other kinds of input devices 514 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback; and input from the user can be received in any form, including acoustic, speech, tactile, or brain wave input. Examples of output devices 516 include display devices, such as a CRT (cathode ray tube) or LCD (liquid crystal display) monitor, for displaying information to the user.

According to one aspect of the present disclosure, the computing device 110 can be implemented using a computer system 500 in response to processor 502 executing one or more sequences of one or more instructions contained in memory 504. Such instructions may be read into memory 504 from another machine-readable medium, such as data storage device 506. Execution of the sequences of instructions contained in main memory 504 causes processor 502 to perform the process steps described herein. One or more processors in a multi-processing arrangement may also be employed to execute the sequences of instructions contained in memory 504. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., as a data server, or that includes a middleware component, e.g., an application server, or that includes a front end component, e.g., a computing computer having a graphical user interface or a Application through which a user can interact with an implementation of the subject matter described in this specification, or any combination of one or more such back end, middleware, or front end components. The components of the system can be interconnected by any form or medium of digital data communication, e.g., a communication network. The communication network (e.g., network 140) can include, for example, any one or more of a personal area network (PAN), a local area network (LAN), a campus area network (CAN), a metropolitan area network (MAN), a wide area network (WAN), a broadband network (BBN), the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

Computing system 500 can include computing devices and servers. A computing device and server are generally remote from each other and typically interact through a communication network. The relationship of computing device and server arises by virtue of computer programs running on the respective computers and having a computing-server relationship to each other. Computer system 500 can be, for example, and without limitation, a desktop computer, laptop computer, or tablet computer. Computer system 500 can also be embedded in another device, for example, and without limitation, a mobile telephone, a personal digital assistant (PDA), a mobile audio player, a Global Positioning System (GPS) receiver, a video game console, and/or a television set top box.

The term "machine-readable storage medium" or "computer readable medium" as used herein refers to any medium or media that participates in providing instructions to processor 502 for execution. Such a medium may take many forms, including, but not limited to, non-volatile media, volatile media, and transmission media. Non-volatile media include, for example, optical or magnetic disks, such as data storage device 506. Volatile media include dynamic memory, such as memory 504. Transmission media include coaxial cables, copper wire, and fiber optics, including the wires that include bus 508. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

While this specification contains many specifics, these should not be construed as limitations on the scope of what may be claimed, but rather as descriptions of particular implementations of the subject matter. Certain features that are described in this specification in the context of separate implementations of the subject technology can also be implemented in combination in a single implementation.

Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

The subject matter of this specification has been described in terms of particular aspects, but other aspects can be implemented and are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other variations are within the scope of the following claims.

These and other implementations are within the scope of the following claims.

What is claimed is:

1. A computer-implemented method for transferring a state of an application from a second computing device to a first computing device, the method comprising:
    detecting a presence of a second computing device, wherein the detecting of the presence is based on a proximity of the second computing device to a first computing device;
    receiving from the second computing device, a request to initiate a transfer of a state of a first application on the second computing device, wherein a second application on the first computing device is configured to restore the state of the first application;
    sending to the second computing device, in response to the received request, an approval to initiate the transfer;
    receiving from the second computing device, based on the sent approval, the state of the first application; and
    sending to the second computing device, an indication of a successful transfer.

2. The computer-implemented method of claim 1, wherein the detecting of the presence is based on at least one of a physical proximity or a network proximity of the second computing device to the first computing device.

3. The computer-implemented method of claim 1, wherein the detecting of the presence is based on a first network connection between the second computing device and the first computing device, wherein the first network connection is configured for communication over a short distance.

4. The computer-implemented method of claim 1, wherein the first computing device is configured to provide for display, based on the detecting of the presence, a first notification indicating the presence of the second computing device, wherein the first notification is configured to accept a first command to cause the second computing device to send to the first computing device, the request to initiate the transfer.

5. The computer-implemented method of claim 4, wherein the second computing device is configured to provide for display, a second notification indicating the request to initiate the transfer, and wherein the second notification is configured to accept a second command to cause the first computing device to send to the second computing device, the approval to initiate the transfer.

6. The computer-implemented method of claim 5, wherein the approval sent to the second computing device is in response to the second notification on the second computing device, indicating the request to initiate the transfer of the state of the first application from the second computing device to the first computing device.

7. The computer-implemented method of claim 1, wherein the second computing device is configured to remove, based on the received indication, the state of the first application from the second computing device.

8. The computer-implemented method of claim 1, wherein the first application is a first web-based application and the second application is a second web-based application, and wherein the state of the first web-based application comprises an operation history of the first web-based application.

9. The computer-implemented method of claim 1, wherein the first application is a first web browser and the second application is a second web browser, and wherein the state of the first application corresponds to a web browsing session within the first web browser.

10. The computer-implemented method of claim 1, wherein the state of the first application is expressed in Document Object Model format.

11. A system for transferring a state of an application from a second computing device to a first computing device, the system comprising:
    a memory comprising instructions for transferring a state of an application from a second computing device to a first computing device; and
    a processor configured to execute the instructions to:
        detect a presence of the second computing device, wherein a detection of the presence is based on a proximity of the second computing device to the first computing device;
        receive from the second computing device, a request to initiate a transfer of a state of a first application on the second computing device, wherein a second application on the first computing device is configured to restore the state of the first application;
        send to the second computing device, in response to the received request, an approval to initiate the transfer;
        receive from the second computing device, based on the sent approval, the state of the first application; and
        send to the second computing device, an indication of a successful transfer, wherein the second computing device is configured to remove, based on the received indication, the state of the first application from the second computing device.

12. The system of claim 11, wherein the proximity of the second computing device to the first computing device is at least one of a physical proximity or a network proximity of the second computing device to the first computing device.

13. The system of claim 11, wherein the detection of the presence is based on a first network connection between the second computing device and the first computing device, wherein the first network connection is configured for communication over a short distance.

14. The system of claim 11, wherein the processor is further configured to:
provide for display, based on the detection of the presence, a first notification indicating the presence of the second computing device, wherein the first notification is configured to accept a first command to cause the second computing device to send to the first computing device, the request to initiate the transfer.

15. The system of claim 14, wherein the second computing device is configured to provide for display, a second notification indicating the request to initiate the transfer, and wherein the second notification is configured to accept a second command to cause the first computing device to send to the second computing device, the approval to initiate the transfer.

16. The system of claim 15, wherein the approval sent to the second computing device is in response to a second notification on the second computing device, indicating the request to initiate the transfer of the state of the first application from the second computing device to the first computing device.

17. The system of claim 11, wherein the first application is a first web-based application and the second application is a second web-based application, and wherein the state of the first web-based application comprises an operation history of the first web-based application.

18. The system of claim 11, wherein the first application is a first web browser, and wherein the second application is a second web browser and the state of the first application corresponds to a web browsing session within the first web browser.

19. The system of claim 11, wherein the state of the first application is expressed in Document Object Model format.

20. A non-transitory machine-readable storage medium comprising machine-readable instructions for causing a processor to execute a method for transferring a state of an application from a second computing device to a first computing device, the method comprising:
detecting a presence of the second computing device, wherein the detecting of the presence is based on a proximity of the second computing device to the first computing device, wherein the proximity is at least one of a physical proximity or a network proximity of the second computing device to the first computing device;
receiving from the second computing device, a request to initiate a transfer of a state of a first application on the second computing device, wherein a second application on the first computing device is configured to restore the state of the first application;
sending to the second computing device, in response to the received request, an approval to initiate the transfer;
receiving from the second computing device, based on the sent approval, the state of the first application; and
sending to the second computing device, an indication of a successful transfer.

* * * * *